US007864243B2

United States Patent
Tsutsumi

(10) Patent No.: US 7,864,243 B2
(45) Date of Patent: Jan. 4, 2011

(54) IMAGE PICK-UP APPARATUS WITH RIGHT AND LEFT MICROPHONES DISPOSED ON OPPOSING ARCUATE SIDES OF A FRONT CABINET WITH A FLASH MECHANISM POSITIONED THEREBETWEEN

(75) Inventor: Yuka Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 11/886,522

(22) PCT Filed: Mar. 30, 2006

(86) PCT No.: PCT/JP2006/306698

§ 371 (c)(1),
(2), (4) Date: Apr. 3, 2008

(87) PCT Pub. No.: WO2006/109582

PCT Pub. Date: Oct. 19, 2006

(65) Prior Publication Data

US 2008/0273108 A1    Nov. 6, 2008

(30) Foreign Application Priority Data

Apr. 6, 2005    (JP) .............................. 2005-109388

(51) Int. Cl.
H04N 5/225    (2006.01)
H04N 5/222    (2006.01)
(52) U.S. Cl. .................. 348/373; 348/333.01; 381/355
(58) Field of Classification Search ......... 348/373–376, 348/333.01
See application file for complete search history.

(56) References Cited

U.S. PATENT DOCUMENTS

| 3,555,206 | A | * | 1/1971 | Dvorsky | 381/347 |
| 4,864,425 | A | * | 9/1989 | Blazek et al. | 386/107 |
| 5,657,084 | A | * | 8/1997 | Kurokawa et al. | 348/373 |
| 5,923,750 | A | * | 7/1999 | Enting et al. | 379/433.03 |
| 6,078,758 | A | * | 6/2000 | Patton et al. | 396/312 |

(Continued)

FOREIGN PATENT DOCUMENTS

JP    10-294981    11/1998

(Continued)

OTHER PUBLICATIONS

Extended European Search Report issued May 20, 2009 for corresponding European Application No. 06 73 0646.

*Primary Examiner*—Tuan Ho
*Assistant Examiner*—Hung H Lam
(74) *Attorney, Agent, or Firm*—Rader, Fishman & Grauer PLLC

(57) ABSTRACT

Microphone mechanisms are disposed on both sides of a flash mechanism provided in a video camera's front cabinet, and the microphone mechanisms are incorporated in the front cabinet. The video camera 1 includes: a camera body 2; a front cabinet 3 provided at the front of the camera body 2; a viewfinder 4 provided on an upper face 2a of the camera body 2; a grip belt 5 provided on a first side face 2b of the camera body 2; and a flash mechanism 8 provided in the camera body 2. In the front cabinet 3, microphone mechanisms 9 are provided on both the right and left sides sandwiching the flash mechanism 8.

4 Claims, 14 Drawing Sheets

U.S. PATENT DOCUMENTS

| | | |
|---|---|---|
| 6,507,659 B1 * | 1/2003 | Iredale et al. .................. 381/26 |
| 7,013,017 B2 * | 3/2006 | Pavlovic ...................... 381/369 |
| 2004/0096205 A1 * | 5/2004 | Kato et al. ................... 396/350 |
| 2005/0007445 A1 * | 1/2005 | Foote et al. ............... 348/14.08 |
| 2005/0083314 A1 * | 4/2005 | Shalit et al. ................. 345/179 |
| 2007/0126164 A1 * | 6/2007 | Baumhauer et al. ......... 267/136 |

FOREIGN PATENT DOCUMENTS

| | | |
|---|---|---|
| JP | 2005-078861 | 3/2005 |
| WO | WO-96/10884 | 4/1996 |

* cited by examiner

IMAGE PICK-UP APPARATUS WITH RIGHT AND LEFT MICROPHONES DISPOSED ON OPPOSING ARCUATE SIDES OF A FRONT CABINET WITH A FLASH MECHANISM POSITIONED THEREBETWEEN

TECHNICAL FIELD

The present invention relates to image pickup apparatuses such as a video camera and the like. To be specific, microphone mechanisms are provided on both the right and left sides of a flash mechanism provided in a front cabinet of the image pickup apparatus, which makes it possible to record the sound stereophonically.

BACKGROUND ART

As shown in FIG. 17, there is a video camera known wherein a recess 103 for mounting microphone bodies 102 on the front side of the front cabinet 101 of the video camera is provided, the pair of microphone bodies 102 being incorporated sideways in the recess 103. Further, a weight ring 104 is attached to a periphery of the microphone body 102. The microphone body 102 with the weight ring 104 around it is mounted in a damper 105 made of a rubber material such as an elastomer.

The damper 105 includes an inner cylinder portion 106, an external cylinder portion 107 which is made by folding back one end of the inner cylinder portion 106, and a flange 108 provided on one end of the external cylinder portion 107. The microphone body 102 with the weight ring 104 around it is housed in the inner cylinder portion 106. The external cylinder portion 107 of the damper 105 housing the microphone body 102 is received in a receiving hole 110 of a microphone holder 109. Then, as shown in FIG. 18, the microphone holder 109 housing the damper 105 inside the receiving hole 110 is inserted into the recess 103 of the front cabinet 101 of the video camera. Further, the microphone body 102 is mounted in the recess 103 through the damper 105 by sandwiching and holding the flange 108 between a peripheral portion 111 of the receiving hole 110 of the microphone holder 109 and a bottom 112 of the recess 103 of the front cabinet 101 of the video camera (See, for example, Japanese Patent Laid-open No. 294981-1998).

The above prior art video camera had the following problems.

(1) As described above, the video camera is constructed such that the recess 103 is provided in the front of the front cabinet 101 of the video camera for mounting the microphone mechanisms and the pair of microphone mechanisms 105 are mounted in the recess 103. Therefore, considerable space is used at the front of the front cabinet 101 of the video camera for mounting the microphone mechanisms 105.

(2) Since the pair of microphone mechanisms 105 are mounted sideways in the recess 103, it is effective to capture sound coming from the front. However, it is difficult to record sound with depth by using them.

It is an object of the present invention to provide a video camera wherein, unlike the prior art video camera, a recess for mounting microphone mechanisms is not required in the front of the front cabinet of the video camera and wherein sound can be captured stereophonically on both sides of the front cabinet.

DISCLOSURE OF THE INVENTION

According to the present invention, in an image pickup apparatus including: a camera body; a front cabinet provided at the front of the camera body; a viewfinder provided on the top of the camera body; and a grip belt provided on a first side face of the camera body, microphone mechanisms are mounted on the right and left sides sandwiching a flash mechanism in the front cabinet.

Two or more microphone bodies are provided in the microphone mechanisms mounted on the right and left sides sandwiching the flash mechanism. Also, the two or more microphone bodies are disposed in the microphone mechanisms at predetermined spaces in the front and back directions of the front cabinet.

The microphone mechanism includes the microphone bodies, dampers made of an elastic material for holding the microphone bodies, and a damper supporting plate with the dampers fitted in damper mounting holes. With the dampers facing microphone receiving holes made in a microphone mounting part of the front cabinet, the damper supporting plate is mounted on the inner face of the front cabinet. There is provided a part to be positioned which engages with a positioning part provided on the inner face of the front cabinet and positioning the damper supporting plate in relation to the inner face of the front cabinet when the damper supporting plate is mounted on the inner face of the front cabinet.

There are provided, in the damper, an inner cylinder portion holding a microphone body therein, an external cylinder portion made by folding back one end of the inner cylinder portion, and a flange provided on one end of the external cylinder portion. There is also provided an annular groove in the rim of the flange. Thus, the damper is mounted in the damper supporting plate when an edge of the microphone receiving hole of the damper supporting plate is fitted in the annular concave groove.

With the microphone mechanisms disposed on both the right and left sides sandwiching the flash mechanism, sound can be recorded stereophonically. In particular, since two or more microphone bodies are provided in the microphone mechanisms disposed on both the right and left sides sandwiching the flash mechanism, there are at least four or more microphone bodies provided. With those microphone bodies, sound can be recorded more stereophonically. Moreover, since the two or more microphone bodies are disposed at the predetermined spaces in the front and back directions of the front cabinet, the sound coming in the front and back directions of the front cabinet can be recorded stereophonically.

The damper is mounted in the damper mounting hole of the damper supporting plate. Therefore, through the damper supporting plate, with the damper facing the microphone receiving hole made in the microphone mounting part of the front cabinet, the damper can easily be mounted in the front cabinet. In particular, when the damper is mounted on the inner face of the front cabinet, the damper supporting plate is positioned to the front cabinet by having the part to be positioned which is provided on the damper supporting plate engage with the positioning part provided on the inner face of the front cabinet. The damper can easily be attached to the damper supporting plate by fitting the edge of the microphone receiving hole of the damper supporting plate in the annular concave groove provided in the flange of the damper.

BEST MODE FOR CARRYING OUT THE INVENTION

The image pickup apparatus of the present invention will hereafter be explained in the order of (1) General construction of image pickup apparatus, (2) Construction of microphone mechanism, (3) Construction of grip part (Fingertips contact part), (4) Operation, and (5) Other embodiments.

(1) General Construction of Image Pickup Apparatus

Figure 1:
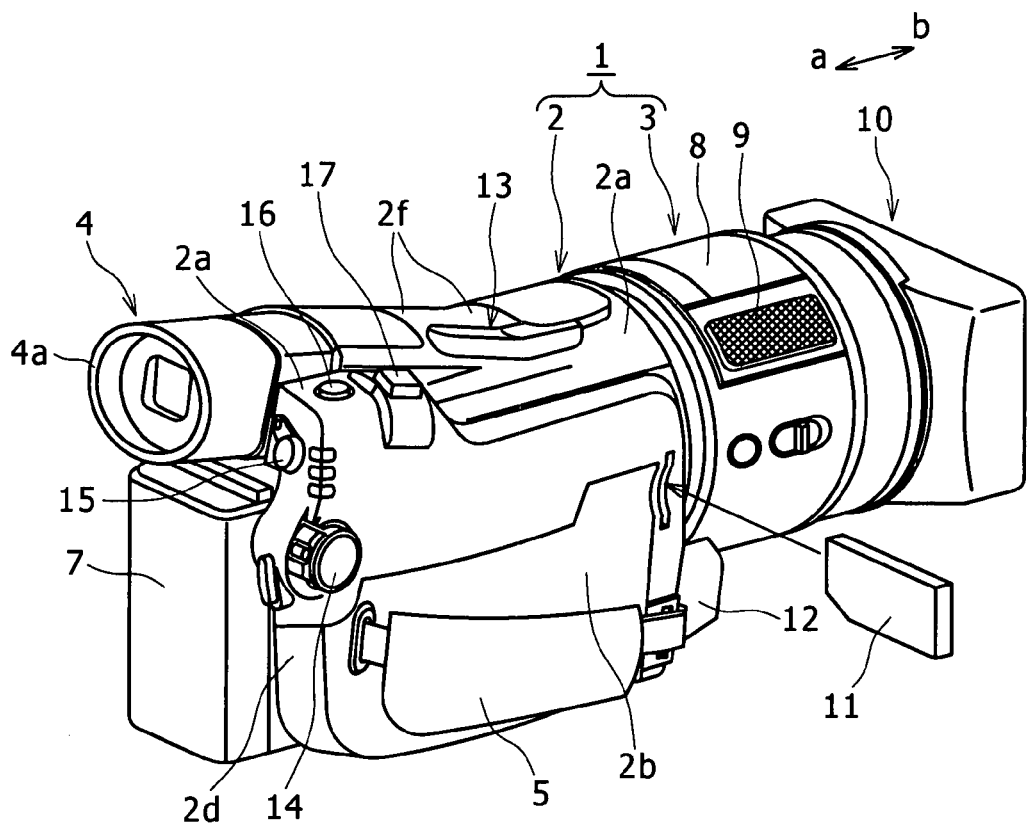
FIG. 1 is a perspective view of a video camera of a first embodiment seen from the side of a grip belt.
Figure 2:
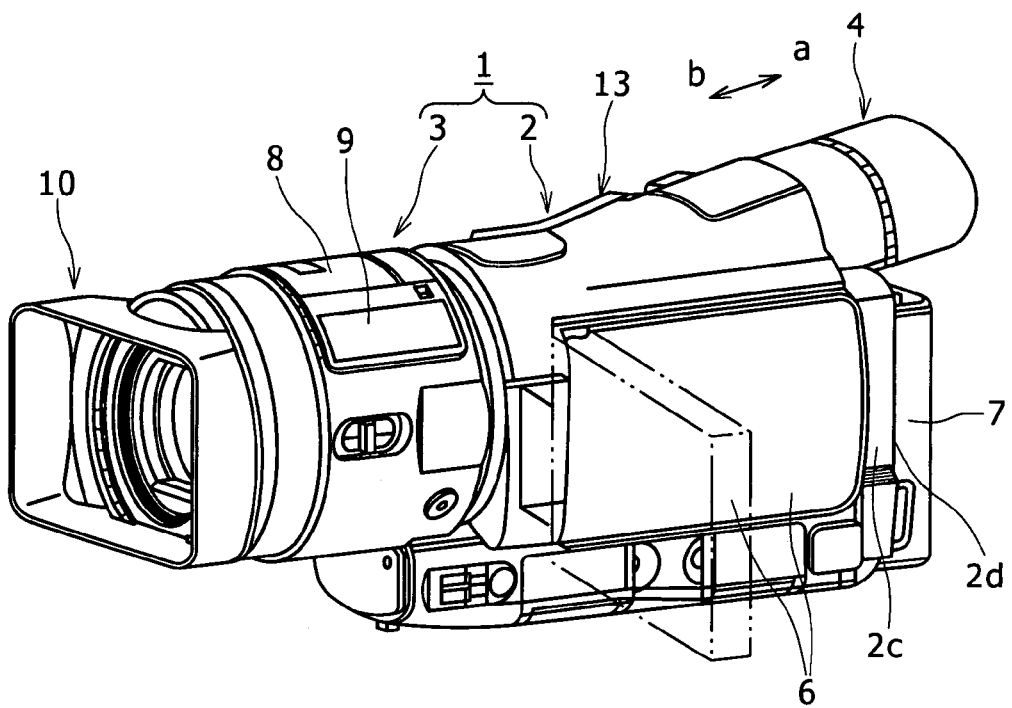
FIG. 2 is a perspective view of the video camera seen from the side of a monitor.
Figure 3:
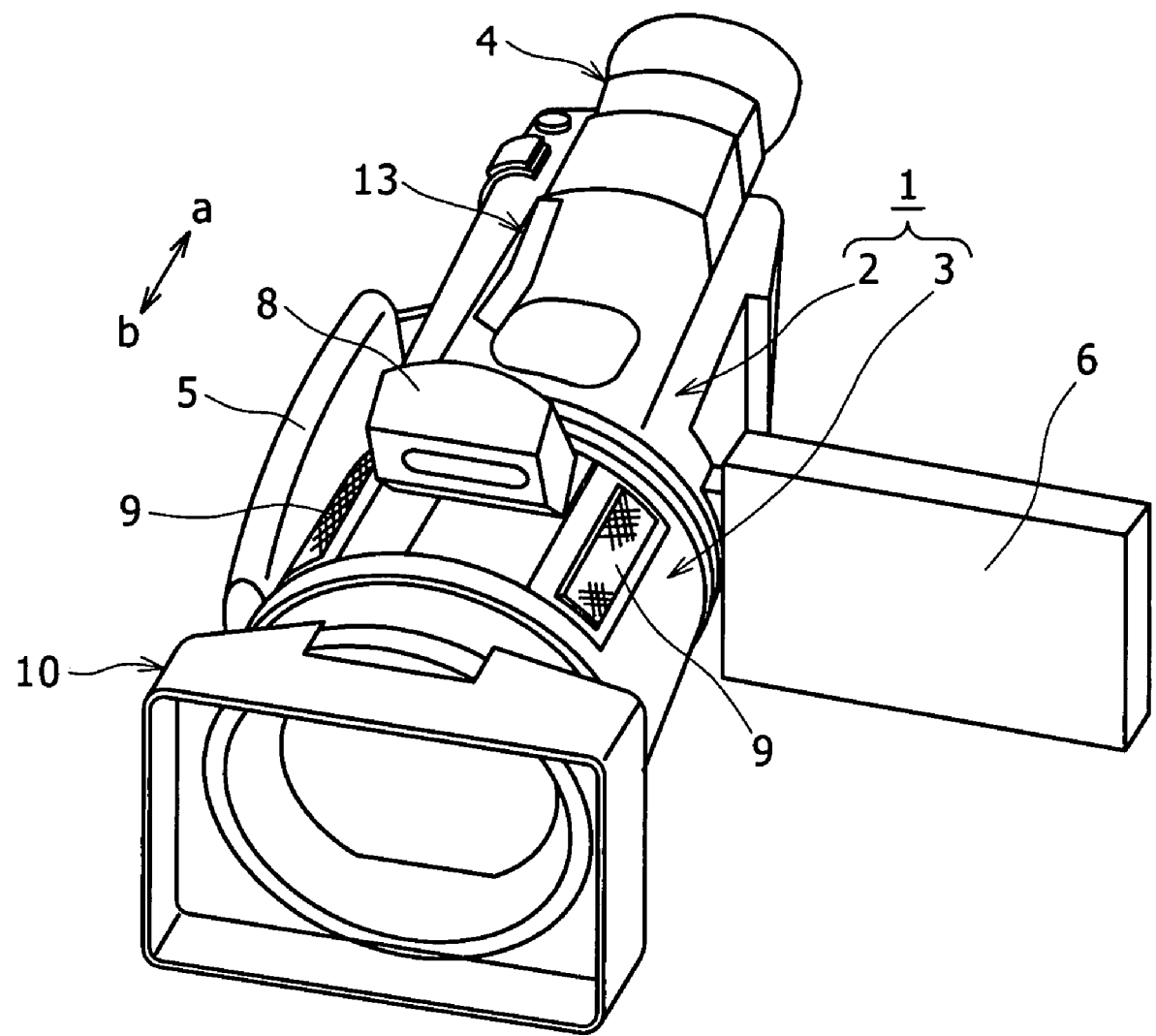
FIG. 3 is a perspective view of a viewfinder and the monitor in active use.

FIGS. 1 to 3 show a video camera 1 as an example of the image pickup apparatus. FIG. 1 is a perspective view of the video camera 1 seen from the side of a grip belt, FIG. 2 is a perspective view of the video camera 1 seen from the side of a monitor, and FIG. 3 is a perspective view of a viewfinder and the monitor being in use. The video camera 1 includes: a camera body 2; a front cabinet 3 provided at the front of the camera body 2; a viewfinder 4 provided on the side of an upper face 2a of the camera body 2; a grip belt 5 provided on a first side face 2b of the camera body 2; a monitor 6 provided on a second side face 2c opposite to the first side face 2b of the camera body 2; and a battery box 7 removably attached to the rear side 2d of the camera body 2. A retractable flash 8 is provided in an upper portion of the front cabinet 3, and a pair of microphone mechanisms 9 and 9 are provided on both sides of the flash 8. A lens hood 10 is removably attached to the top of the front cabinet 3. Further, a memory-card slot 12 into which a memory card 11 is inserted is provided in the first side face 2b of the camera body 2.

A grip part 13 is provided on the upper face 2a of the camera body 2 so that fingertips touch it when the camera body 2 is gripped.

Figure 4:
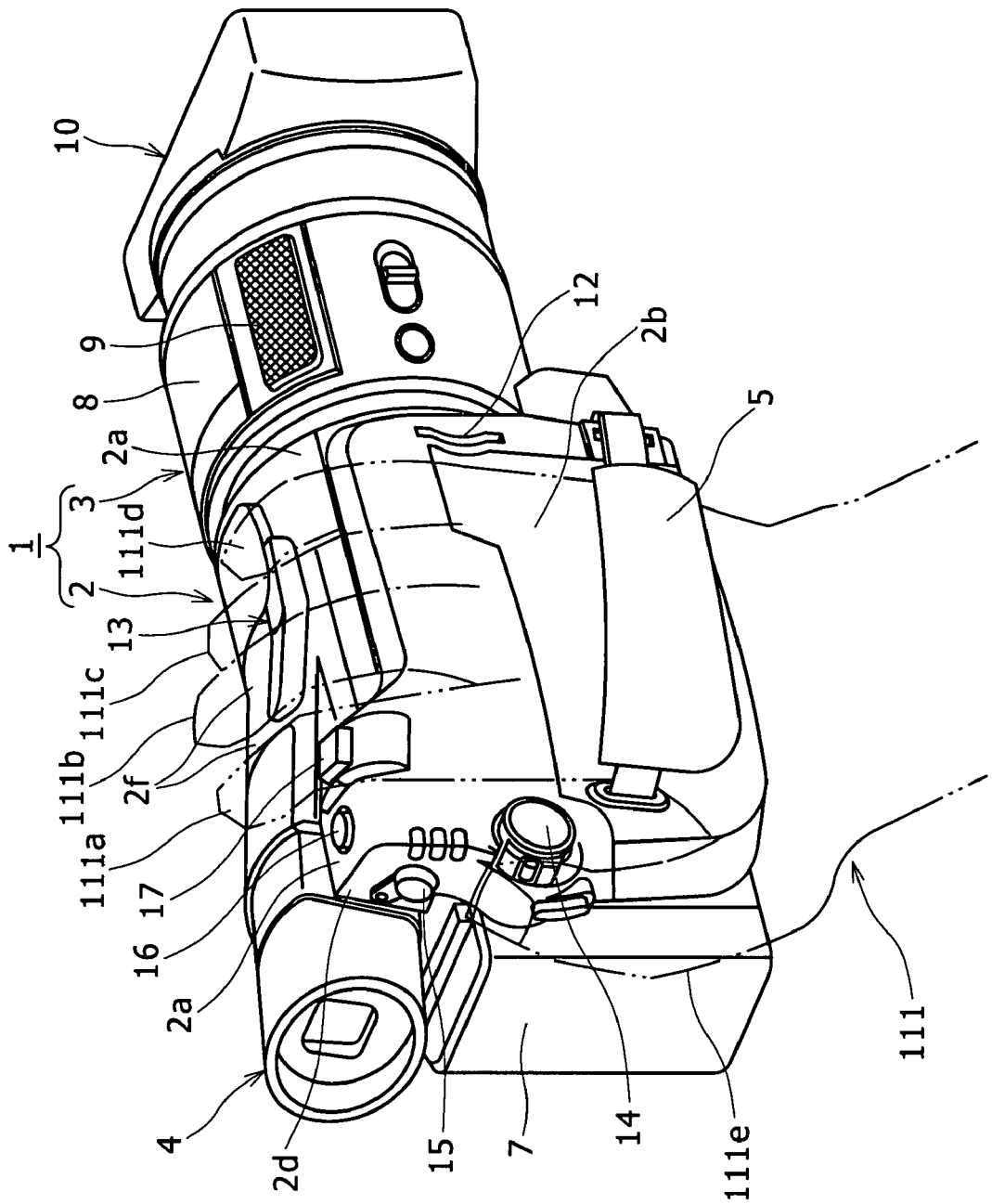
FIG. 4 is a perspective view of the video camera being gripped.

As shown in FIG. 4, an index finger 111a, a middle finger 111b, a third finger 111c, and a little finger 111d are inserted between the first side face 2b of the camera body 2 and the grip belt 5 with a thumb 111e left outside the grip belt 5, the camera body 2 is gripped by pressing down the grip part 13 provided on the upper face 2a of the camera body 2 with fingertips of the middle finger 111b, third finger 111c, and little finger 111d, a power button 14, a start-stop button 15 for taking moving pictures, etc. provided on the rear side 2d of the camera body 2 are pressed with the thumb 111e left outside the grip belt 5, and a start-stop button 16 for taking still pictures, a zoom button 17, etc. provided on the upper face 2a of the camera body 2 are pressed with the index finger 111a.

(2) Construction of Microphone Mechanism

As shown in FIG. 3, the microphone mechanisms 9 are disposed on both sides of the pop-up type flash mechanism 8 provided on the upper portion of the front cabinet 3.

Figure 7:
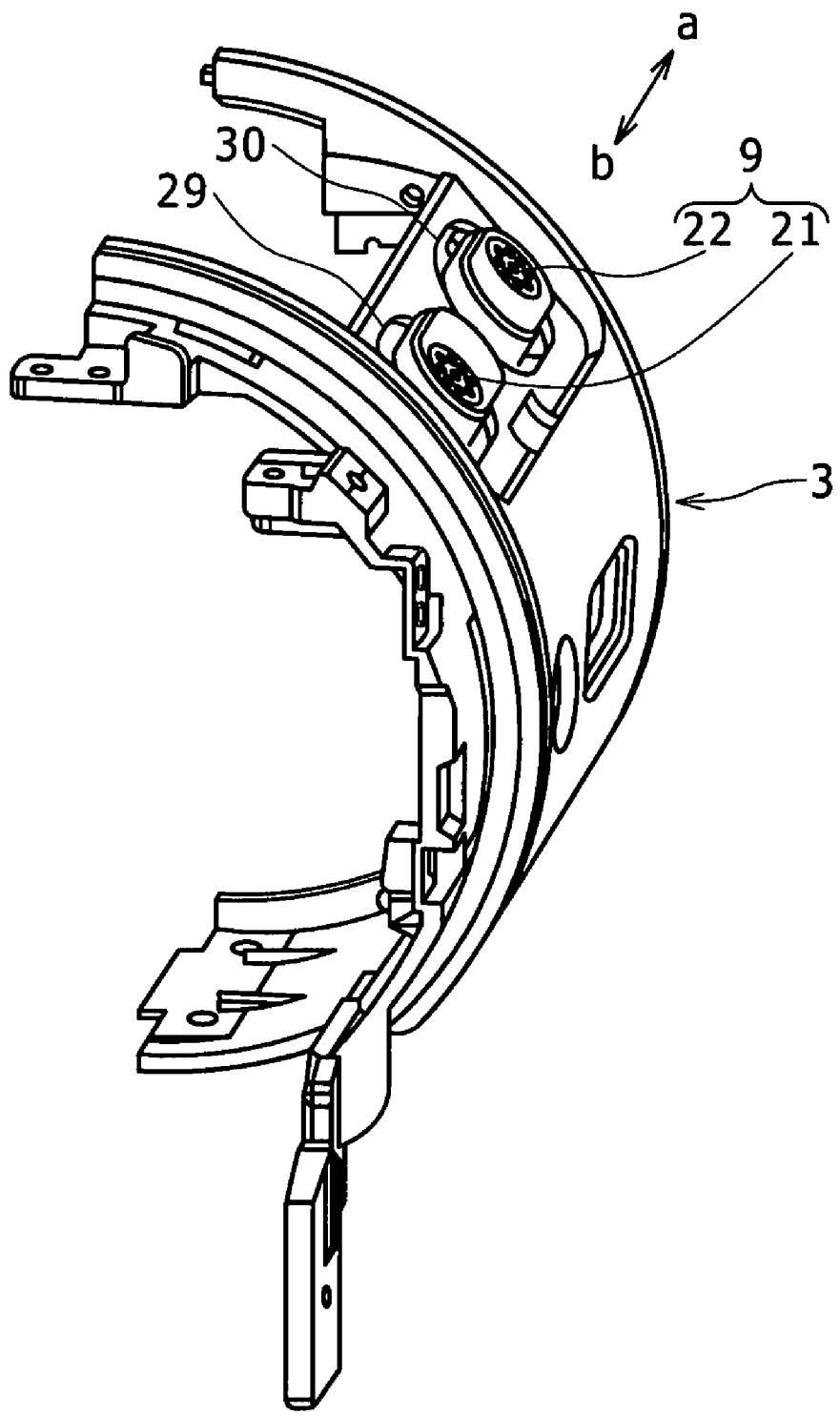
FIG. 7 is a perspective view of first and second microphone bodies mounted in a front cabinet.

As shown in FIG. 7, the microphone mechanism 9 includes first and second microphone bodies 21 and 22. The first and second microphone bodies 21 and 22 are disposed with a predetermined space therebetween in the front and back directions a and b of the front cabinet 3.

Figure 8:
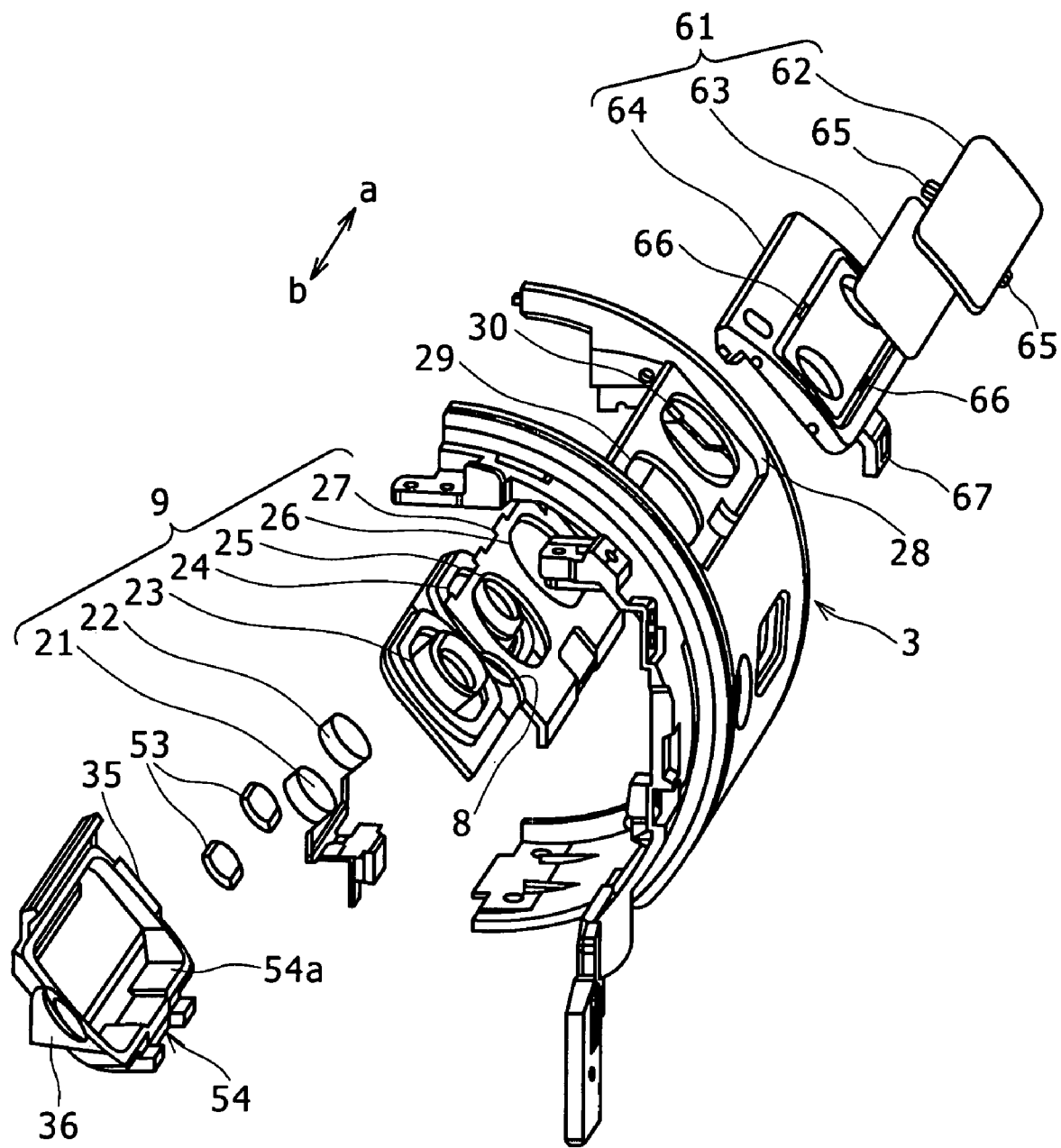
FIG. 8 is an exploded perspective view of a microphone mechanism.

As shown in FIG. 8, the microphone mechanism 9 includes the first and second microphone bodies 21 and 22, first and second dampers 23 and 24 made of an elastic material such as rubber which store the above first and second microphone bodies 21 and 22, and a damper supporting plate 27 for fitting the first and second dampers 23 and 24 in first and second damper mounting holes 25 and 26.

With the first damper 23 mounted in the first damper mounting hole 25 facing a first microphone receiving hole 29 made in a microphone receiving part 28 of the front cabinet 3 and with the second damper 24 mounted in the second damper mounting hole 26 facing a second microphone receiving hole 30 made in the microphone mounting part 28, the damper supporting plate 27 is mounted on an inner face of the front cabinet 3.

Figure 9:
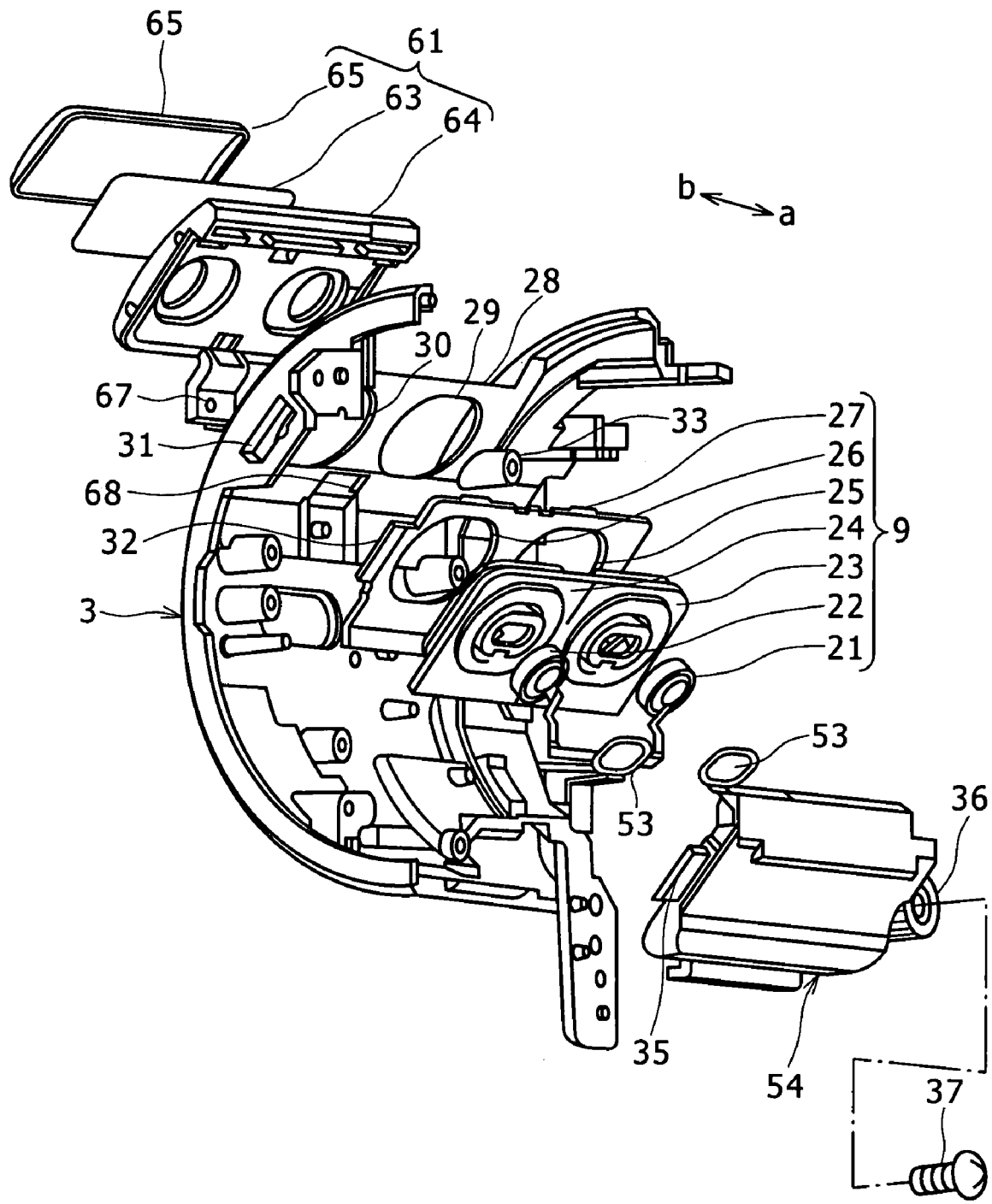
FIG. 9 is an exploded perspective view of the microphone mechanism.

As shown in FIG. 9, the damper supporting plate 27 includes, on one side, a first part 32 to be positioned for positioning the damper supporting plate 27 in relation to the inner face of the front cabinet 3 by engaging with a positioning part 31 provided on the inner face of the front cabinet 3 when the damper supporting plate 27 is mounted on the inner face of the front cabinet 3. The damper supporting plate 27 also includes a circular-arc second part 34 to be positioned (See FIG. 8) provided on the other side for engaging with a circumferential side face of a cylindrical boss 33 provided on the inner face of the front cabinet 3.

Figure 10:
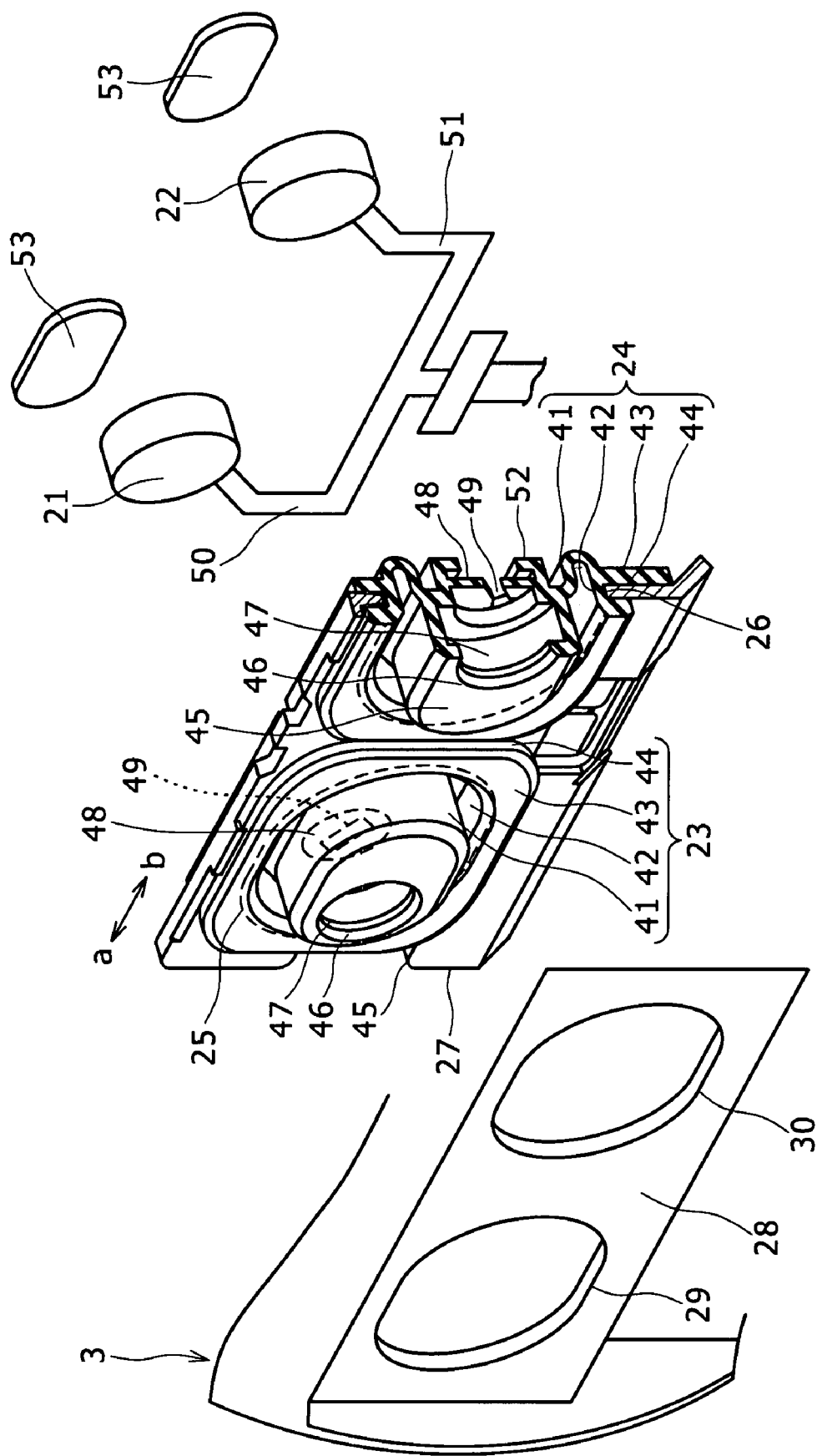
FIG. 10 is a cross section of dampers.
Figure 11:
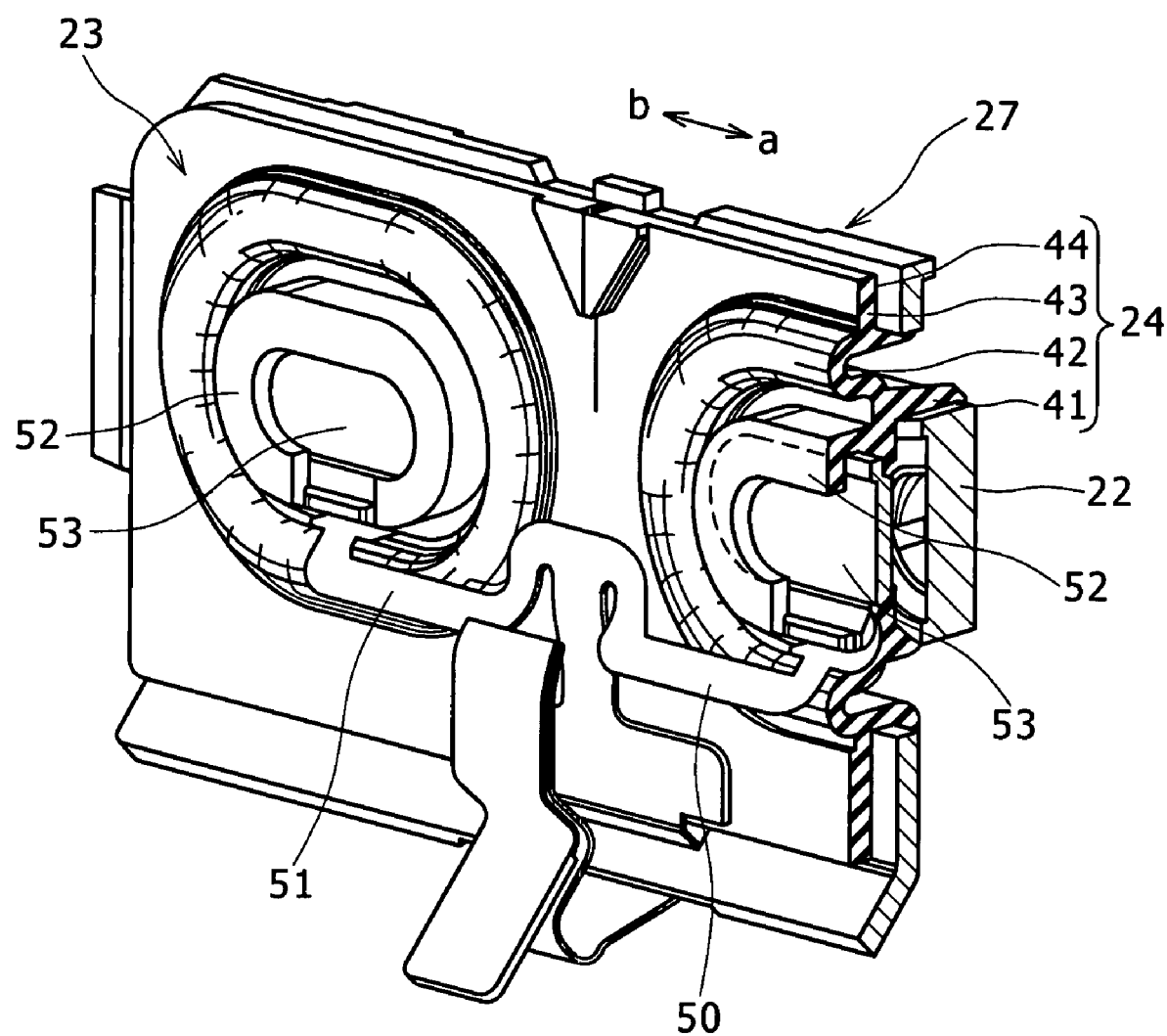
FIG. 11 is a cross section of the dampers.

As shown in FIGS. 10 and 11, the first damper 23 includes an inner cylinder portion 41 receiving the first microphone body 21 and an external cylinder portion 42 formed by folding back one end of the inner cylinder portion 41, and a flange 43 provided on one end of the external cylinder portion 42. The flange 43 has an annular concave groove 44 in its periphery.

The first damper 23 is mounted in the damper supporting plate 27 when an edge of the first damper mounting hole 25 of the damper supporting plate 27 is fitted with the annular concave groove 44. The second damper 24 is also formed like the first damper 23, and is fitted in the second damper mounting hole 26 of the damper supporting plate 27.

The inner cylinder portions 41 of the first and second dampers 23 and 24 are ovally shaped in the front and back directions a and b of the front cabinet 3, and the inner cylinder portions 41 of these dampers 23 and 24 are disposed in series.

A hole portion 46 whose diameter is smaller than an outer diameter of the microphone body 21 is formed in an upper face 45 of the inner cylinder portion 41 of the first damper 23. Also, in the inner cylinder portion 41, a cylindrical microphone-body receiving part 47 is provided to receive and hold the first microphone body 21. A notched portion 49 is made in an under surface 48 of the microphone-body receiving part 47, and the microphone body 21 is received in the microphone-body receiving part 47 by pressing and extending the notched portion 49. An upper surface of the first microphone body 21 faces outside through the hole portion 46, and a lead wire 50 connected to the first microphone body 21 is pulled out of the inner cylinder portion 41 through the notched portion 49.

The inner cylinder portion 41 of the second damper 24 is also formed like the inner cylinder portion 41 of the first damper 23, and an upper surface of the second microphone body 22 faces outside through the hole portion 46. A lead wire 51 connected to the second microphone body 22 is pulled out of the inner cylinder portion 41 through the notched portion 49. Further, a cover-plate mounting part 52 is provided at the bottom of the inner cylinder portion 41 of the first and second dampers 23 and 24, and the notched portion 49 is closed by a cover plate 53 attached to the cover-plate mounting part 52.

As shown in FIG. 10, the first damper 23 is fitted in the first damper mounting hole 25 of the damper supporting plate 27, and the second damper 24 is fitted in the second damper mounting hole 26 of the damper supporting plate 27.

The damper supporting plate 27 allows the first damper 23 fitted in the first damper mounting hole 25 to face a first microphone receiving hole 29, made in the microphone mounting part 28 of the front cabinet 3, and allows the second damper 24 fitted in the second damper mounting hole 26 to face a second microphone receiving hole 30 made in the microphone mounting part 28. Then, as shown in FIG. 9, the damper supporting plate 27 allows the first part 32 to be positioned which is provided on the damper supporting plate 27 to engage with the positioning part 31 provided on the front cabinet 3. Further, a first circular-arc part 34 to be positioned (See FIG. 8) provided in one side face of the damper supporting plate 27 is allowed to engage with a circumferential surface of the cylindrical boss 33 inside the front cabinet 3. Thus, it is mounted in a state where it is positioned inside the microphone mounting part 28 of the front cabinet 3. A back side of the damper supporting plate 27 is covered with a cover plate 54.

Figure 12:
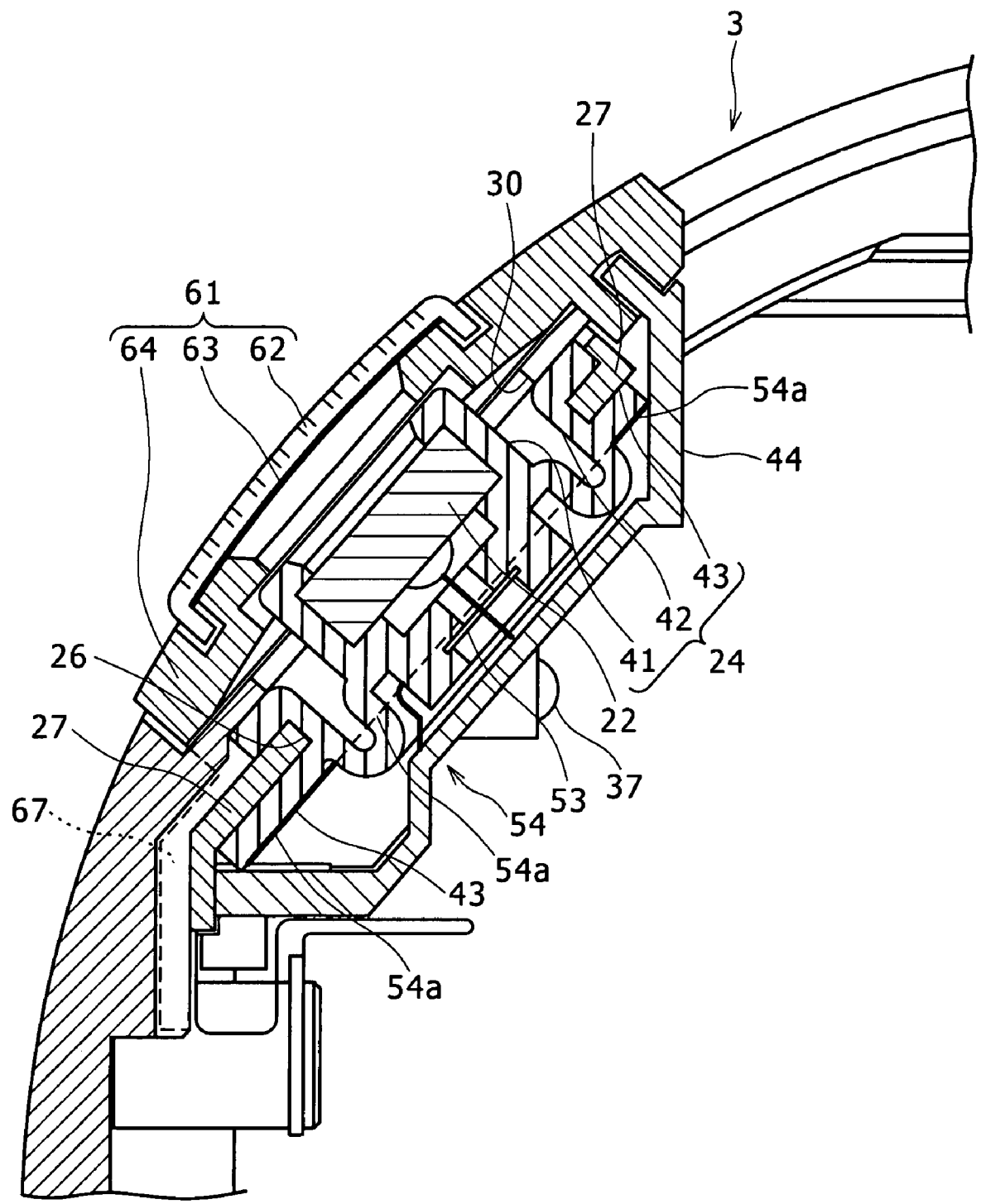
FIG. 12 is a cross section of the microphone mechanism mounted in the front cabinet.

As shown in FIG. 9, the cover plate 54 includes a first tongue-like fixing part 35 on one side and a boss-like second fixing part 36 on the other side. By allowing the first fixing part 35 to engage with the positioning part 31 provided on the front cabinet 3, the cover plate 54 is fixed in a state where the first part 32 to be positioned which is provided on the damper supporting plate 27 is pressed to the inner face of the front cabinet 3. Further, the boss-like second fixing part 36 is fastened with a screw 37 in a state where it is placed on the top of the cylindrical boss 33 provided on the inner face of the front cabinet 3. Then, as shown in FIG. 12, the flanges 43 of the first and second dampers 23 and 24 are pressed onto the damper supporting plate 27 with peripheral portions 54a of the cover plate 54 to seal the first and second damper mounting holes 25 and 26 made in the damper supporting plate 27. Thus, the motor sound etc. inside the main body are prevented from escaping to the outside of the first and second dampers 23 and 24, and being picked up by the first and second microphone bodies 21 and 22. A grill unit 61 is attached to an outer face of the microphone mounting part 28 of the front cabinet 3.

As shown in FIGS. 8 and 9, the grill unit 61 includes: a microphone grill 62 made of metal or a synthetic resin in which countless small holes are formed; a filter sheet 63 made of nonwoven fabric which is put on the under surface of the microphone grill 62; and a base plate 64 made of a synthetic resin which supports the microphone grill 62 and the filter sheet 63.

The microphone grill 62 includes two or more engaging projections 65, and the microphone grill 62 is attached to the surface of the base plate 64 by allowing the two or more engaging projections 65 to engage with projection-engaging parts 66 provided on the base plate 64 in a state where the filter sheet 63 is sandwiched between the microphone grill 62 and the base plate 64.

The base plate 64 includes an engaging projection 67, and is attached to the microphone mounting part 28 of the front cabinet 3 by allowing the engaging projection 67 to engage with the projection-engaging part 68 provided on the front cabinet 3.

(3) Construction of Grip Part

Fingertips Contact Part

As shown in FIG. 1, the grip part 13 is so formed on the upper face 2a of the camera body 2 as to extend in a band from the front (the side of the front cabinet 3) toward the rear side 2d in the direction of an optical axis. Further, as described above, it is touched by fingertips of the middle finger 111b, third finger 111c, and little finger 111d when the camera body 2 is gripped.

Figure 5:
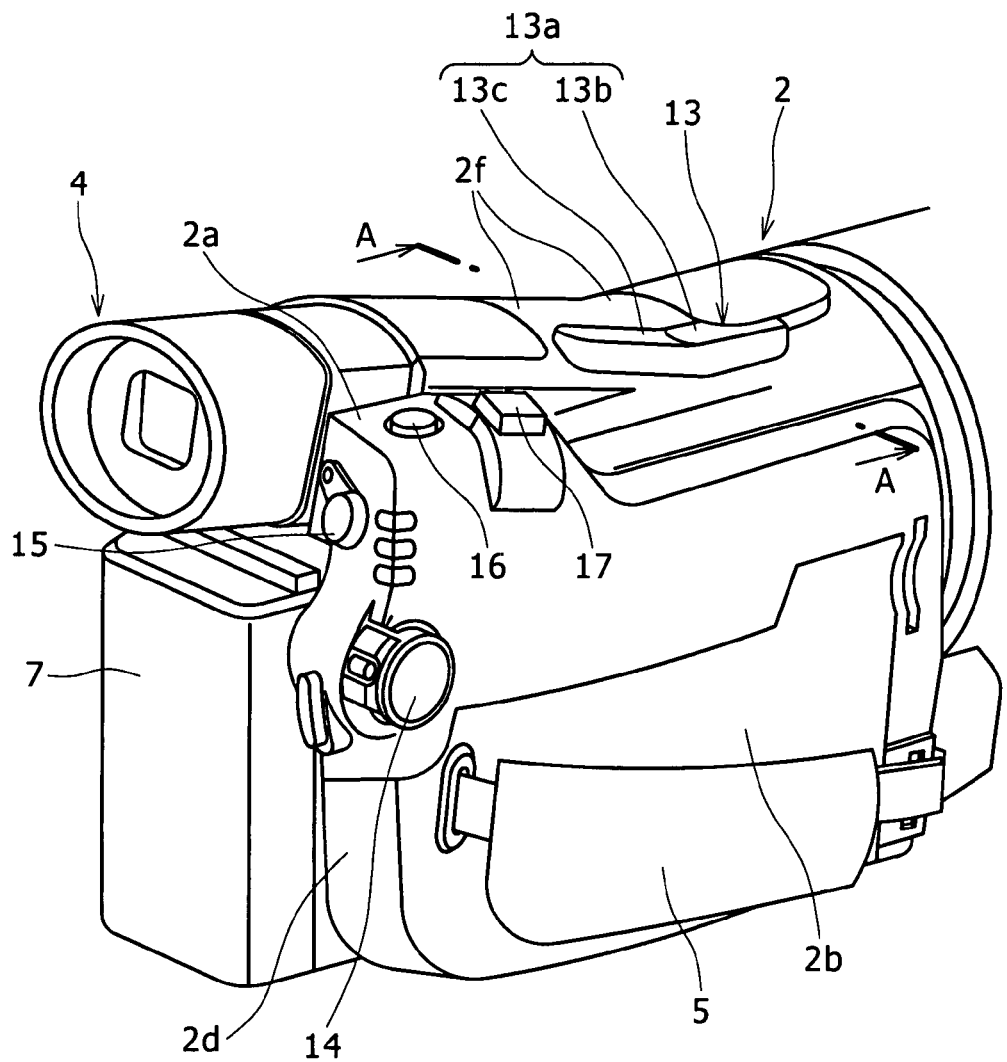
FIG. 5 is a perspective view of a principal part of the video camera.

As shown in FIG. 5, the upper face of the grip part 13 is a slope 13a which rises from the front side toward the rear side of the camera body 2. The slope 13a includes a first slope portion 13b with a small angle of inclination and a second slope portion 13c with an angle of inclination which is greater than that of the first slope portion 13b. The fingertip of the little finger 111d hits the first slope portion 13b, and the fingertips of the index finger 111a, middle finger 111b, and third finger 111c hit the second slope portion 13c.

Figure 13:
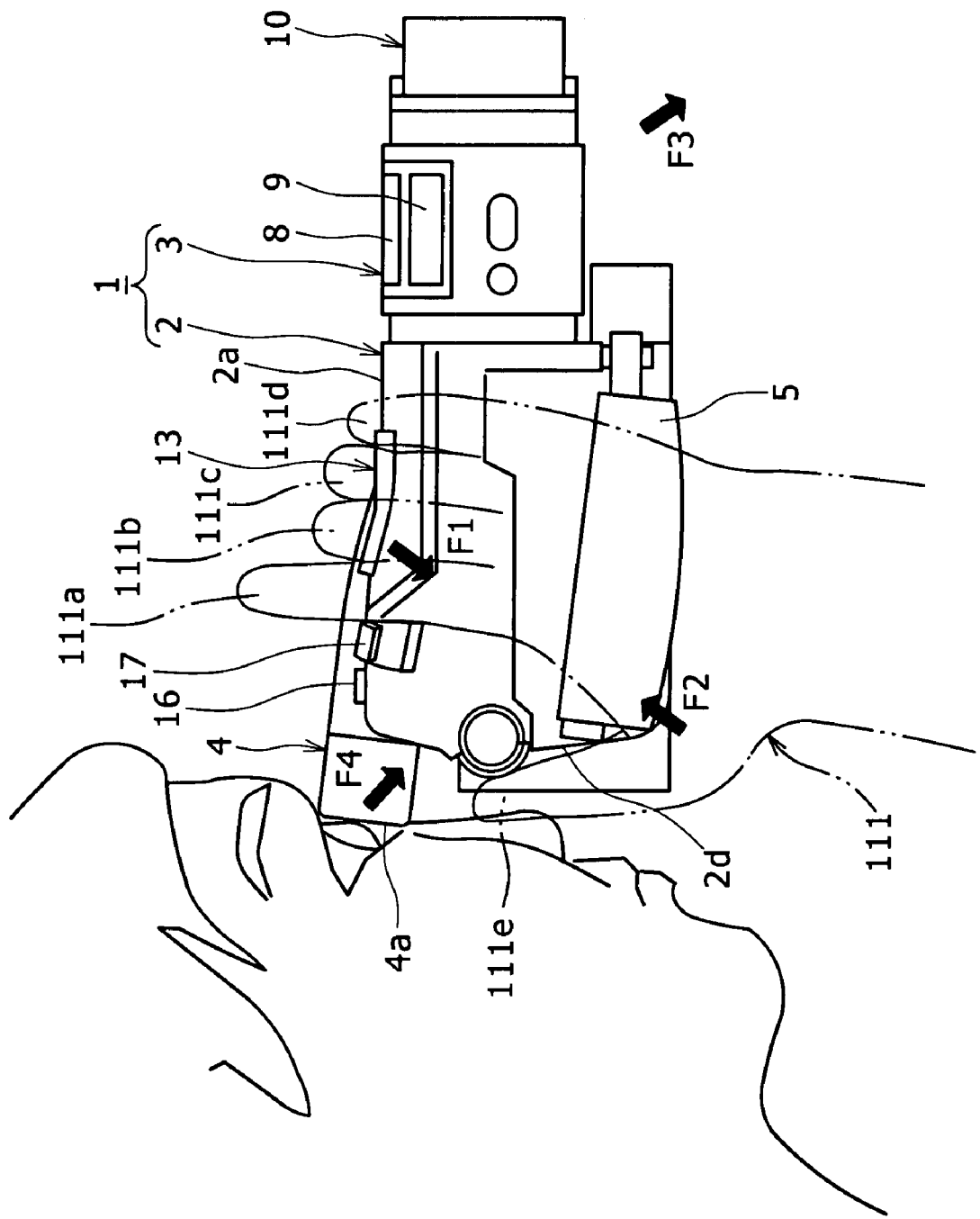
FIG. 13 is a side view in which shooting is carried out by using the video camera.

As shown in FIG. 13, the angle of inclination of the grip part 13 is formed to correspond to an angle of inclination formed by difference in elevation of the fingertips of the index finger 111a, middle finger 111b, third finger 111c, and little finger 111d when the index finger 111a, middle finger 111b, third finger 111c, and little finger 111d are bent to grip the camera body 2.

Figure 6:
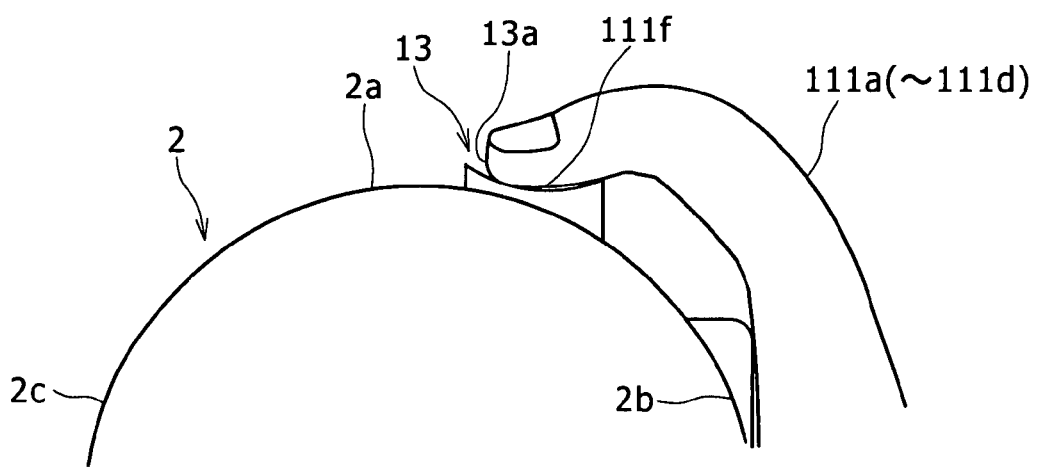
FIG. 6 is an A-A cross section of FIG. 5.

Further, as shown in FIG. 6, a portion of the upper face 13a of the grip part 13 between the end of the first side face 2b of the camera body 2 and the end of the second side face 2c opposite to the first side face 2b is formed as a substantial circular-arc recess. When the fingertips of the index finger 111a, middle finger 111b, third finger 111c, and little finger 111d are applied to the upper face 13a of the grip part 13, it becomes possible to have the fingertips of the index finger 111a, middle finger 111b, third finger 111c, and little finger 111d fit the upper face 13a of the grip part 13 so as to press the grip part 13 reliably with those fingertips. Further, a non-slip treatment is given to the upper face 13a of the grip part 13 by making its surface rough etc., which prevents the fingers from slipping when the upper face 13a of the grip part 13 is pressed. The grip part 13 is formed separately (as a separate body) from the camera body 2, and is attached to the camera body 2.

The vicinity of the portion where the grip part 13 is provided on the upper face 2a of the camera body 2 is also formed as a slope 2f whose angle of inclination is substantially the same as the angle of inclination of the grip part 13. A viewfinder 4 is disposed on the upper end side of the slope 2f. The viewfinder 4 is mounted such that its angle of inclination is adjustable with respect to the upper face 2a of the camera body 2 by a tilt mechanism (not shown).

The minimum angle of inclination of the viewfinder 4 is set such that it is substantially equal to the angle of inclination of the upper face 2a of the camera body 2 and the grip part 13 in their longitudinal direction (in the direction of the optical axis) when the view finder 4 is tilted toward the side of the upper face 2a of the camera body 2. When the viewfinder 4 is tilted toward the side of the upper face 2a of the camera body 2 and the angle of inclination of the viewfinder 4 is made to be minimum, as shown in FIGS. 1 and 2, the viewfinder 4, the upper face 2a of the camera body 2, and the grip part 13 exhibit a continuous line at substantially the same angle of inclination, which eliminates the discomfort caused by the existence of the grip part 13 and also makes its appearance favorable. Within the range from the minimum angle of inclination at which the viewfinder 4 is tilted toward the side of the upper face 2a of the camera body 2 to the maximum angle of inclination at which the viewfinder 4 is erected substantially perpendicularly to the upper face 2a of the camera body 2 as shown in FIG. 3, the viewfinder 4 can be used at a desired angle of inclination.

(4) Operation

The image pickup apparatus of the embodiment is made according to the above construction. As shown in FIG. 13, the index finger 111a, middle finger 111b, third finger 111c, and little finger 111d are inserted between the grip belt 5, the one side face 2b of the camera body 2, and the grip belt 5, and the inclined grip part 13 is pressed down with fingertips of these four fingers. On the other hand, the lower end of the rear of the camera body 2 is supported by the base of a thumb 111e which is left outside the grip belt 5. The direction of a force F1 applied when the grip part 13 is pressed by the fingertips of the index finger 111a, middle finger 111b, third finger 111c, little finger 111d, etc. and the direction of a force F2 applied to the lower end of the rear of the camera body 2 by the base of the thumb are substantially opposite. Therefore, unlike the case of the prior art where the flat top of the camera body is pressed, a force F3 in a rotating direction (tilting direction) is not applied to the camera body, allowing the camera body 2 to be gripped stably. In particular, when an eyecup 4a of the viewfinder 4 is applied to an eye while shooting, it becomes possible to grip the camera body 2 more reliably with a pressing force F4 of the eye.

By leaving the index finger 111a free, it becomes possible to press a start-stop button 16 for taking still pictures or a zoom button 17 provided on the upper face 2a of the camera body 2 with the index finger 111a. Further, it becomes possible to press a power button 14 provided on the rear side 2d of the camera body 2 or a start-stop button 15 for taking moving pictures with the thumb 111e which is left outside the grip belt 5.

The recording during shooting is conducted by the first and second microphone bodies 21 and 22 of the microphone mechanisms 9 disposed on both sides of the pop-up flash mechanism 8 provided in the upper portion of the front cabinet 3, namely, by four microphone bodies 21 and 22 in all.

Since the microphone bodies 21 and 22 are mounted in the front cabinet 3 through the first and second dampers 23 and 24, they are protected from the vibration coming from the side of the front cabinet 3. Further, as shown in FIG. 12, by pressing flanges 43 of the first and second dampers 23 and 24 against the damper supporting plate 27 with peripheral portions 54a of the cover plate 54, peripheral portions of the first and second damper mounting holes 25 and 26 are sealed. This structure prevents the noise caused by a motor etc. incorporated in the camera body 2 or in the front cabinet 3 from escaping through the damper mounting holes 25 and 26 to the outside of the front cabinet 3 and being picked up by the first and second microphone bodies 21 and 22.

(5) Other Embodiments

Figure 14:
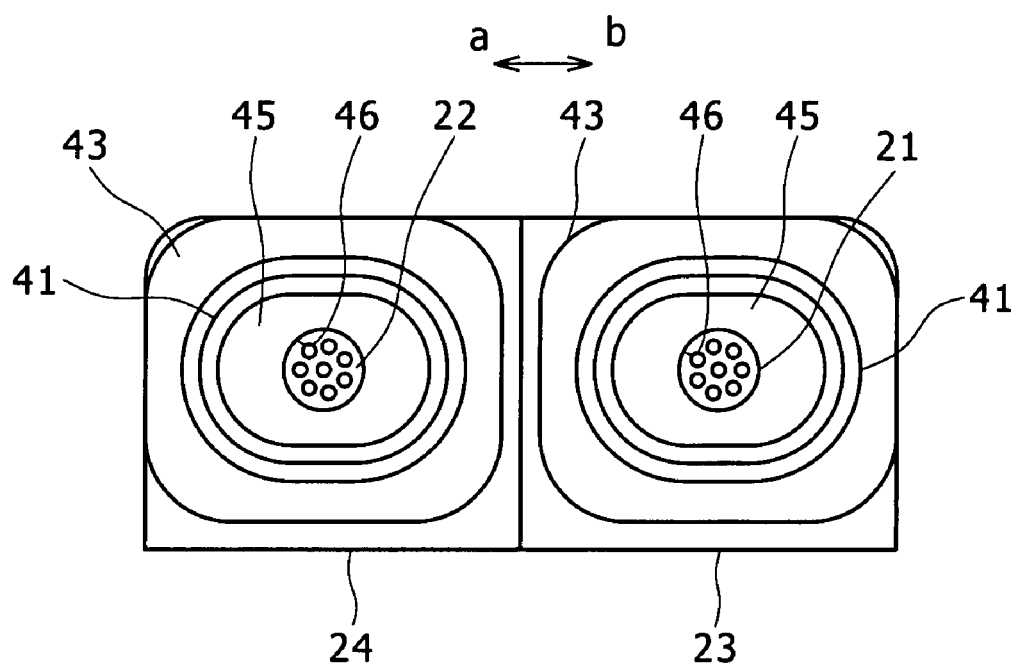
FIG. 14 is a plan view of another embodiment of dampers.
Figure 15:
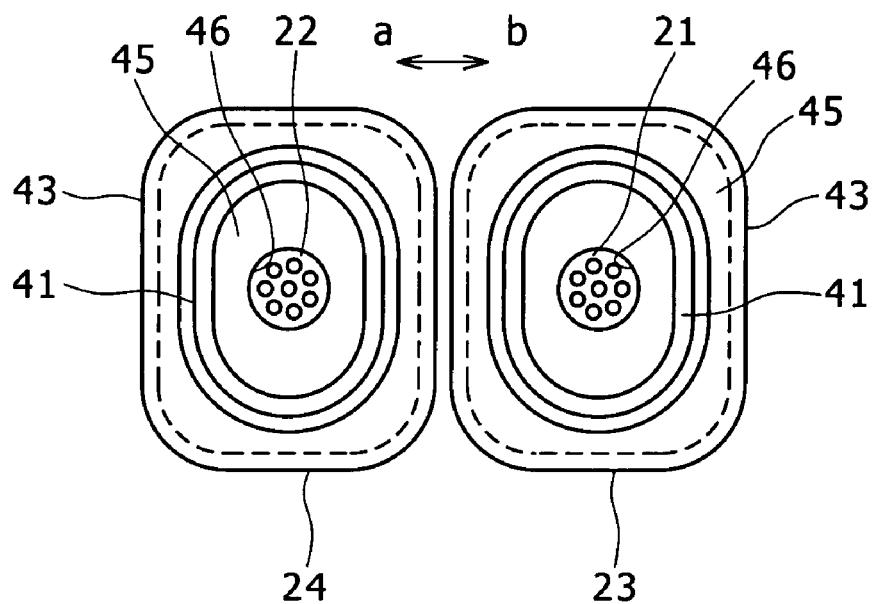
FIG. 15 is a plan view of another embodiment of dampers.
Figure 16:
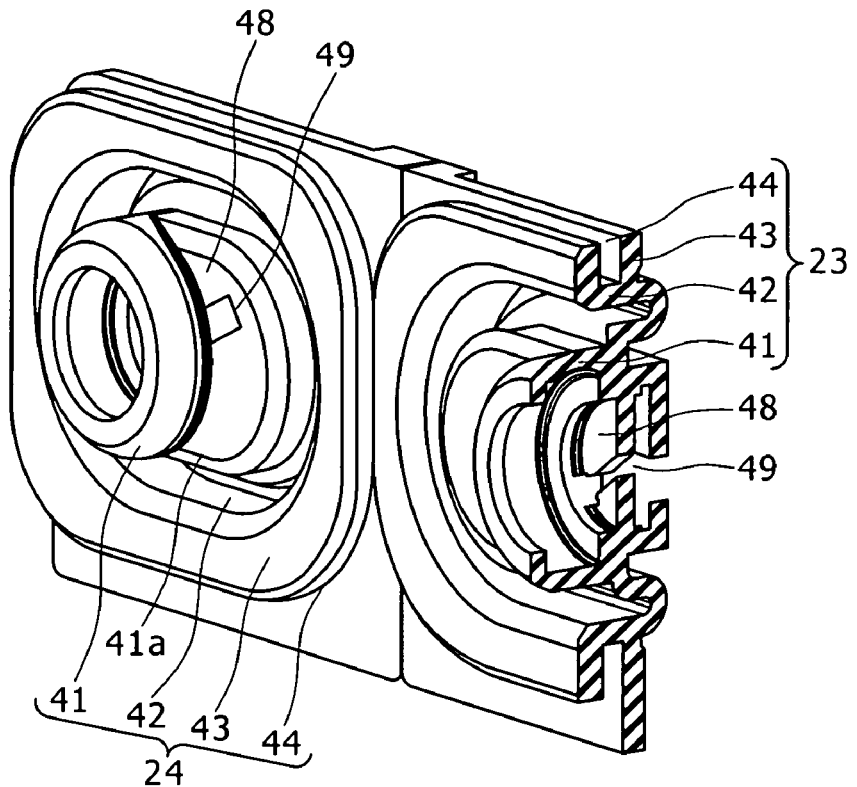
FIG. 16 is a perspective view of another embodiment of dampers.
Figure 17:
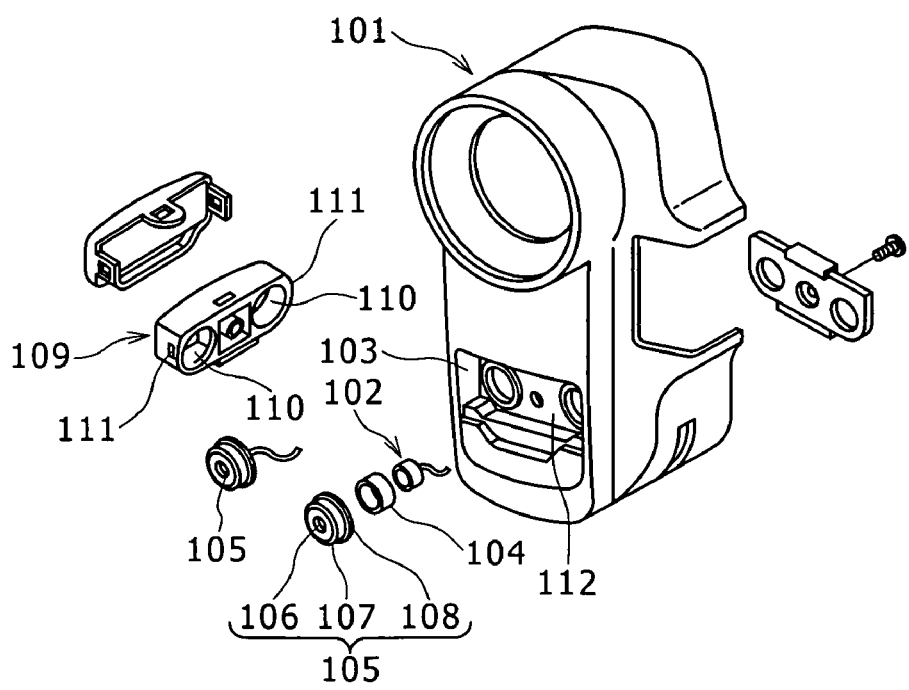
FIG. 17 is a perspective view of an example of prior art.
Figure 18:
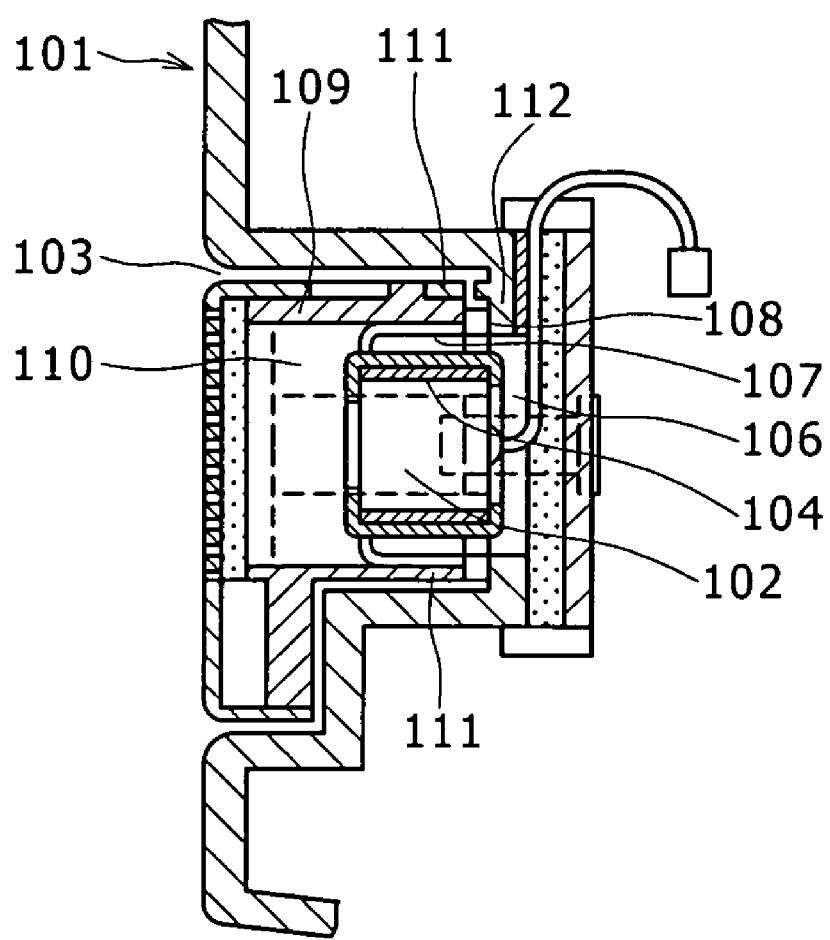
FIG. 18 is a cross section of the example of prior art.

According to the above embodiment, the inner cylinder portions 41 of the first and second dampers 23 and 24 are formed ovally in the front and back directions a and b of the front cabinet 3. Further, the inner cylinder portions 41 of the dampers 23 and 24 are arranged in series, and the first and second microphone bodies 21 and 22 are mounted to the ends (distal ends) of the oval inner cylinder portions 41 in series of the first and second dampers 23 and 24. This is for securing enough space between the first microphone body 21 and the second microphone body 22 in the front and back directions a and b of the front cabinet 3. Therefore, as shown in FIG. 14, the first and second microphone bodies 21 and 22 may be mounted in central parts of the inner cylinder portions 41 of the first and second dampers 23 and 24. Alternatively, as shown in FIG. 15, they may be provided in a direction perpendicular to the longitudinal directions of the inner cylinder portions 41 of the first and second dampers 23 and 24 with respect to the front and back directions a and b of the front cabinet 3. Further, as shown in FIG. 16, a notched portion 41a may be provided in part of the inner cylinder portion 41. By providing the notched portion 41a, when forming a damper, the deformation, strain, etc. of the inner cylinder portion 41 caused by so-called shrinkage etc. can be suppressed. Further, in the above embodiment, for the sake of the standard for securing safety of the electronic device, the example where the first damper 23 and second damper 24 are formed separately is shown. Depending on the size of the damper, however, the first damper and the second damper 24 may be formed as one body. Also, the digital video camera has been described as an image pickup apparatus. However, the image pickup apparatus may be a still photography camera or one of other cameras.

The invention claimed is:
1. An image pickup apparatus comprising:
    a camera body;
    a front cabinet provided at the front of the camera body;
    a viewfinder provided on an upper rearward face of the camera body; and
    a grip belt provided on a first side face of the camera body,
    wherein said front cabinet is generally cylindrical in shape and has an upper forwardly arcuate face disposed forwardly of and longitudinally aligned with the upper rearward face of the camera body,
    wherein said front cabinet has built-in microphone mechanisms on both the right and left arcuate sides of the front cabinet sandwiching a flash mechanism therebetween,
    wherein the built-in microphone mechanisms are disposed adjacent the flash mechanism,
    wherein each microphone mechanism comprises two or more microphone bodies,
    wherein said microphone mechanism comprises said microphone bodies, dampers made of an elastic material holding the microphone bodies, and a damper supporting plate with the dampers mounted in damper mounting holes,
    wherein said damper supporting plate is mounted to the inner face of said front cabinet with said dampers facing microphone receiving holes made in a microphone mounting part of said front cabinet,
    wherein said damper comprises an inner cylinder portion in which said microphone body is inserted and held, an external cylinder portion which is made by folding back one end of the inner cylinder portion, and a flange provided on one end of the external cylinder portion, and wherein said flange has an annular concave groove in its rim and is mounted to said damper supporting plate when an edge of the microphone receiving hole of said damper supporting plate is fitted in the annular concave groove.

2. An image pickup apparatus according to claim 1, wherein said two or more microphone bodies are arranged with predetermined spaces therebetween in the front and back directions of said front cabinet.

3. An image pickup apparatus according to claim 1, wherein, for being mounted to the inner face of said front cabinet, said damper supporting plate comprises a part to be positioned for engaging with a positioning part provided on the inner race of the front cabinet and positioning the damper supporting plate in relation to the inner race of the front cabinet.

4. An image pickup apparatus comprising:

a camera body;

a front cabinet provided at the front of the camera body;

a viewfinder provided on an upper face of the camera body; and a grip belt provided on a first side face of the camera body, wherein said front cabinet has built-in microphone mechanisms on both the right and left sides sandwiching a flash mechanism, wherein the microphone mechanism comprises two or more microphone bodies, wherein said microphone mechanism comprises said microphone bodies, dampers made of an elastic material holding the microphone bodies, and a damper supporting plate with the dampers mounted in damper mounting holes, wherein said damper supporting plate is mounted to the inner face of said front cabinet with said dampers facing microphone receiving holes made in a microphone mounting part of said front cabinet, wherein said damper comprises an inner cylinder portion in which said microphone body is inserted and held, an external cylinder portion which is made by folding back one end of the inner cylinder portion, and a flange provided on one end of the external cylinder portion, and wherein said flange has an annular concave groove in its rim and is mounted to said damper supporting plate when an edge of the microphone receiving hole of said damper supporting plate is fitted in the annular concave groove.

* * * * *